United States Patent
Nakano et al.

(10) Patent No.: US 12,305,245 B2
(45) Date of Patent: May 20, 2025

(54) ELECTROLYTIC SMELTING SYSTEM

(71) Applicant: MITSUBISHI HEAVY INDUSTRIES, LTD., Tokyo (JP)

(72) Inventors: Takashi Nakano, Tokyo (JP); Ikumasa Koshiro, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 802 days.

(21) Appl. No.: 17/618,672

(22) PCT Filed: Jan. 23, 2020

(86) PCT No.: PCT/JP2020/002386
§ 371 (c)(1),
(2) Date: Dec. 13, 2021

(87) PCT Pub. No.: WO2020/255468
PCT Pub. Date: Dec. 24, 2020

(65) Prior Publication Data
US 2022/0243293 A1    Aug. 4, 2022

(30) Foreign Application Priority Data
Jun. 21, 2019    (JP) .................................. 2019-115567

(51) Int. Cl.
*C21B 11/10*    (2006.01)
*C22B 4/08*    (2006.01)
(Continued)

(52) U.S. Cl.
CPC ................ *C21B 11/10* (2013.01); *C22B 4/08* (2013.01); *C22B 9/20* (2013.01); *C25C 3/34* (2013.01); *C25C 7/06* (2013.01)

(58) Field of Classification Search
CPC ........... C21B 11/10; C21B 15/00; C22B 4/08; C22B 9/20; C22B 21/00; C25C 3/34;
(Continued)

(56) References Cited

U.S. PATENT DOCUMENTS 4,804,448 A * 2/1989 Sammells ................. C25C 7/04
204/290.01
5,547,494 A * 8/1996 Prasad ................. B01D 53/326
95/12
(Continued)

FOREIGN PATENT DOCUMENTS

CN    1141207    1/1997
GB    1158854    7/1969
(Continued)

OTHER PUBLICATIONS

Office Action issued Jul. 18, 2022 in Chinese Patent Application No. 202080044830.8, with partial English-language translation.
(Continued)

*Primary Examiner* — Jessee R Roe
*Assistant Examiner* — Michael Aboagye
(74) *Attorney, Agent, or Firm* — Wenderoth, Lind & Ponack, L.L.P.

(57) ABSTRACT

An electrolytic smelting system includes: an electrolytic smelting furnace including a furnace body to which a molten ore is introduced, a cathode substrate which is installed on a bottom portion in the furnace body, and an anode substrate which is positioned above the cathode substrate in the furnace body; an inert gas circulation unit including a circulation line to recover an inert gas supplied into the electrolytic smelting furnace together with oxygen and supply the inert gas to the molten ore; and an oxygen-removing unit which is installed in the circulation line and which removes oxygen from the circulation line.

14 Claims, 6 Drawing Sheets

(51) Int. Cl.
*C22B 9/20* (2006.01)
*C25C 3/34* (2006.01)
*C25C 7/06* (2006.01)

(58) Field of Classification Search
CPC ........... C25C 7/06; C25C 7/005; C25C 7/025; B01D 2053/223; B01D 2256/18; B01D 2257/104; B01D 53/228; C21C 1/02; C25B 1/02; F27B 3/08; H01M 8/12; Y02E 60/50; Y02P 10/134
USPC ........................................................ 266/168
See application file for complete search history.

(56) References Cited

U.S. PATENT DOCUMENTS

| | | | |
|---|---|---|---|
| 5,976,345 A | 11/1999 | Pal et al. | |
| 6,090,265 A | 7/2000 | Adler et al. | |
| 6,143,162 A | 11/2000 | Boivin et al. | |
| 7,713,396 B2 * | 5/2010 | Kakuta | C25C 3/02 205/406 |
| 8,764,962 B2 * | 7/2014 | Allanore | C25C 1/00 204/243.1 |
| 10,066,309 B2 * | 9/2018 | Wright | C25C 5/04 |
| 2005/0241943 A1 | 11/2005 | Kakuta et al. | |
| 2006/0191799 A1 * | 8/2006 | Strezov | C25C 3/26 204/243.1 |
| 2017/0167036 A1 | 6/2017 | Tew et al. | |

FOREIGN PATENT DOCUMENTS

| | | |
|---|---|---|
| JP | 50-036412 | 11/1975 |
| JP | 2001-508130 | 6/2001 |
| JP | 2005-11698 | 1/2005 |
| JP | 2012-096932 | 5/2012 |
| WO | 99/21642 | 5/1999 |

OTHER PUBLICATIONS

Lin, Shixiong, "Teaching Books for Colleges and Universities: Petroleum Refining Engineering", Second Part, Second Edition, pp. 323-324, 19880630 (cited in CN Office Action).
Sun, Xing-jin et al., "Development of Molten-Carbonate Fuel-Cell Power System", Chinese Journal of Power Sources, Aug. 2001, vol. 25, No. 4, pp. 303-307.
International Search Report issued on Mar. 31, 2020 in International Application No. PCT/JP2020/002386 with English language translation.
Written Opinion of the International Searching Authority issued on Mar. 31, 2020 in International Application No. PCT/JP2020/002386 with English language translation.

* cited by examiner

ELECTROLYTIC SMELTING SYSTEM

TECHNICAL FIELD

The present invention relates to an electrolytic smelting system.

Priority is claimed on Japanese Patent Application No. 2019-115567, filed Jun. 21, 2019, the content of which is incorporated herein by reference.

BACKGROUND ART

For example, heat treatment using a blast furnace has been widely used as a technique for smelting iron ore. In this method, iron ore as a metal material and coke as a reducing agent are burned in a furnace. In the furnace, carbon contained in coke deprives iron of oxygen to generate heat, carbon monoxide, and carbon dioxide. This reaction heat melts iron ore and produces pig iron. Then, pure iron is obtained by removing impurities from the pig iron.

Since the above method requires a large amount of carbon including coke, the generation amount of carbon monoxide and carbon dioxide becomes large. With the stricter measures against air pollution in recent years, there is a demand for a smelting technique that suppresses the generation amount of a gas containing these carbons. An example of such a technique is an electrolytic smelting method described in Patent Literature 1 below.

In the electrolytic smelting method, a voltage is applied with a pre-melted iron ore interposed between an anode substrate and a cathode substrate. Accordingly, a molten electrolyte containing a slag component is precipitated on the anode substrate side, and molten iron (pure iron) is precipitated on the cathode substrate side. For the anode substrate, a metal material containing iron, chromium, vanadium, and tantalum is used as an example. For the cathode substrate, a metal plate formed of molybdenum is used as an example.

CITATION LIST

Patent Document(s)

Patent Document 1: U.S. Pat. No. 8,764,962

SUMMARY OF INVENTION

Technical Problem

In the electrolytic smelting method, oxygen is generated on the anode substrate side as the electrolytic reaction progresses. In a case where the oxygen concentration (oxygen potential) becomes excessively high or low, impurities may dissolve in pure iron. Therefore, there is an increasing demand for a system capable of performing electrolytic smelting with even higher purity by maintaining an appropriate oxygen potential.

The present invention has been made to solve the above-described problems and an object is to provide an electrolytic smelting system capable of performing highly pure electrolytic smelting and controlling an oxygen potential in order to prevent corrosion of electrodes.

Solution to Problem

An electrolytic smelting system according to an aspect of the present invention includes: an electrolytic smelting furnace including a furnace body to which a molten ore is introduced, a cathode substrate which is installed on a bottom portion in the furnace body, and an anode substrate which is positioned above the cathode substrate in the furnace body; an inert gas circulation unit including a circulation line which is configured to recover an inert gas supplied into the electrolytic smelting furnace together with oxygen and supply the inert gas to the molten ore; and an oxygen-removing unit which is installed in the circulation line and configured to remove oxygen from the circulation line.

According to the above-described configuration, it is possible to recover the oxygen generated on the anode substrate side by the inert gas supplied by the inert gas circulation unit. Accordingly, it is possible to avoid the contamination of impurities due to the existence of oxygen. Further, the oxygen recovered together with the inert gas is removed in the oxygen-removing unit. The inert gas can be supplied to the molten ore again through the circulation line because the oxygen has been removed. Accordingly, it is possible to decrease the usage amount of the inert gas.

In the electrolytic smelting system, the oxygen-removing unit may include a cell stack having a base pipe through which an inert gas and oxygen are flowed and a fuel cell which is installed on an outer peripheral surface of the base pipe and which allows the oxygen in the base pipe to permeate to the outside in response to an applied voltage.

According to the above-described configuration, the oxygen in the base pipe permeates to the outside when a voltage is applied to the fuel cell. The oxygen permeation amount changes in response to the applied voltage. Thus, it is possible to precisely control the oxygen removal amount only by changing the voltage.

The electrolytic smelting system may further include: a temperature control unit which is installed on an upstream side of the oxygen-removing unit in the circulation line and which is configured to control the temperatures of the inert gas and the oxygen flowing through the circulation line to an operating temperature of the fuel cell.

The operating temperature of the fuel cell may differ from the melting point of the molten ore. According to the above-described configuration, the temperature control unit controls the temperatures of the inert gas and the oxygen in the circulation line to the operating temperature of the fuel cell. Accordingly, it is possible to more efficiently perform the oxygen removing process in the oxygen-removing unit.

In the electrolytic smelting system, the temperature control unit may be configured to exchange heat between a relatively high-temperature inert gas and oxygen flowing into the oxygen-removing unit and a relatively low-temperature inert gas flowing out of the oxygen-removing unit.

According to the above-described configuration, the temperature control unit exchanges heat between the gas (the inert gas and the oxygen) flowing into the oxygen-removing unit and the gas flowing out therefrom. The temperature of the gas flowing out of the oxygen-removing unit is relatively lower than the temperature of the gas flowing thereinto. Thus, heat is transferred from the gas flowing into the oxygen-removing unit to the gas flowing out therefrom. Accordingly, it is possible to easily and inexpensively control the temperature of the gas without using another refrigerant or cooling device.

In the electrolytic smelting system, a plurality of through-holes may be formed in the anode substrate so as to penetrate the anode substrate in a vertical direction, and the circulation line may be connected to the plurality of through-holes.

According to the above-described configuration, the inert gas flowing through the circulation line is supplied into the molten ore through the plurality of through-holes formed in the anode substrate. Accordingly, it is possible to more efficiently recover the oxygen generated on the anode substrate and to alginate the molten ore by the flow of the inert gas. As a result, the electrolytic reaction can be stably conducted.

The electrolytic smelting system may further include: a preheating unit which is configured to preheat the molten ore supplied to the furnace body; and a mixing unit which is configured to generate a mixed gas by mixing the oxygen removed from the circulation line in the oxygen-removing unit and some of the inert gas extracted from a downstream side of the oxygen-removing unit in the circulation line and supply the mixed gas to the preheating unit.

According to the above-described configuration, the mixed gas composed of the inert gas and the oxygen is supplied into the molten ore in the preheating unit. It is known that the sulfur content in the molten ore is oxidized (becomes sulfur dioxide) and dissipated into a gas phase when the oxygen partial pressure in the mixed gas is a specific value. That is, according to the above-described configuration, it is possible to efficiently remove the sulfur content contained in the molten ore prior to smelting only by supplying the mixed gas containing oxygen.

The electrolytic smelting system may further include: a preheating unit which is configured to preheat the molten ore supplied to the furnace body, and the oxygen-removing unit may include a first oxygen-removing unit which is configured to generate a mixed gas of the inert gas and the oxygen having a predetermined value of an oxygen partial pressure by removing some of the oxygen from the circulation line by applying a predetermined first voltage and supplies some of the mixed gas to the preheating unit and a second oxygen-removing unit which is configured to remove the oxygen from a residual component of the mixed gas supplied from the first oxygen-removing unit by applying a second voltage higher than the first voltage.

According to the above-described configuration, the mixed gas having a predetermined value of the oxygen partial pressure is generated based on the first voltage in the first oxygen-removing unit. This mixed gas is supplied to the preheating unit. It is known that the sulfur content in the molten ore is oxidized (becomes sulfur dioxide) and dissipated into a gas phase when the oxygen partial pressure in the mixed gas is a specific value. Further, it is also known that the oxygen partial pressure changes based on the magnitude of the applied voltage. Thus, according to the above-described configuration, it is possible to efficiently remove the sulfur content contained in the molten ore prior to smelting only by changing the voltage (applying the first voltage). Further, in the above-described configuration, it is possible to remove the residual oxygen by the second oxygen-removing unit from the residual mixed gas that has not been supplied to the preheating unit. Accordingly, it is possible to supply a highly pure inert gas from the second oxygen-removing unit into the molten ore.

In the electrolytic smelting system, the preheating unit may include a heating tank which stores the molten ore and a nozzle which is positioned in the heating tank and supplies the mixed gas into the molten ore.

According to the above-described configuration, it is possible to efficiently alginate the molten ore stored in the heating tank by the mixed gas blown out from the nozzle. Accordingly, it is possible to further homogenize the molten ore. As a result, it is possible to efficiently conduct the electrolytic reaction that occurs in the furnace body.

In the electrolytic smelting system, the oxygen-removing unit may further include a branch pipe which is branched at a portion corresponding to a middle position of the base pipe in the extension direction and having a predetermined value of an oxygen partial pressure and supplies the mixed gas to the preheating unit.

According to the above-described configuration, the mixed gas is supplied to the preheating unit through the branch pipe. The oxygen partial pressure becomes lower as it goes from the upstream side toward the downstream side in the extension direction in the base pipe. The branch pipe is branched at a portion corresponding to the middle position of the base pipe and having a predetermined oxygen partial pressure. Thus, for example, when the branch pipe is provided at a position capable of obtaining the oxygen partial pressure at which the sulfur content is not easily dissolved in the molten ore and the mixed gas under the oxygen partial pressure is supplied to the preheating unit, it is possible to dissipate the sulfur content from the molten ore into the gas phase without using other devices.

The electrolytic smelting system may further include: a sulfur recovery device which is installed on a downstream side of the preheating unit and which is configured to recover the sulfur content contained in the mixed gas flowing from the preheating unit to generate a desulfurized mixed gas; and a first extraction line which supplies the desulfurized mixed gas from the sulfur recovery device to the mixing unit.

According to the above-described configuration, it is possible to reflux the desulfurized mixed gas containing the inert gas and the oxygen from the sulfur recovery device to the mixing unit through the first extraction line. Thus, it is possible to more precisely control the oxygen partial pressure of the mixed gas generated by the mixing unit. As a result, it is possible to more efficiently recover the sulfur content by the sulfur recovery device.

The electrolytic smelting system may further include: a sulfur recovery device which is installed on a downstream side of the preheating unit and which is configured to recover a sulfur content contained in the mixed gas flowing from the preheating unit to generate a desulfurized mixed gas; and a second extraction line which supplies the desulfurized mixed gas from the sulfur recovery device to the oxygen-removing unit.

According to the above-described configuration, it is possible to reflux the desulfurized mixed gas containing the inert gas and the oxygen from the sulfur recovery device to the oxygen-removing unit through the second extraction line. Thus, it is possible to reuse the inert gas that has been used for recovering the sulfur content in the sulfur recovery device. Accordingly, it is possible to decrease the usage amount of the inert gas.

The electrolytic smelting system may further include: a an oxygen addition line which supplies some of the oxygen removed in the oxygen-removing unit to the mixed gas flowing from the preheating unit toward the sulfur recovery device.

According to the above-described configuration, oxygen is supplied to the mixed gas directed from the preheating unit toward the sulfur recovery device through the oxygen addition line. Accordingly, since the oxygen partial pressure of the mixed gas increases, it is possible to promote the oxidation of the sulfur content contained in the mixed gas. Specifically, it is possible to change sulfur dioxide ($SO_2$) in the mixed gas to more stable sulfur trioxide ($SO_3$). As a result, it is possible to more easily and efficiently recover the sulfur content in the sulfur recovery device.

Advantageous Effects of Invention

According to the present invention, it is possible to provide an electrolytic smelting system capable of performing electrolytic smelting with higher purity and controlling an oxygen potential in order to prevent corrosion of electrodes.

DESCRIPTION OF EMBODIMENTS

Hereinafter, embodiments of the present invention will be described in detail with reference to the drawings.

First Embodiment

Figure 2:
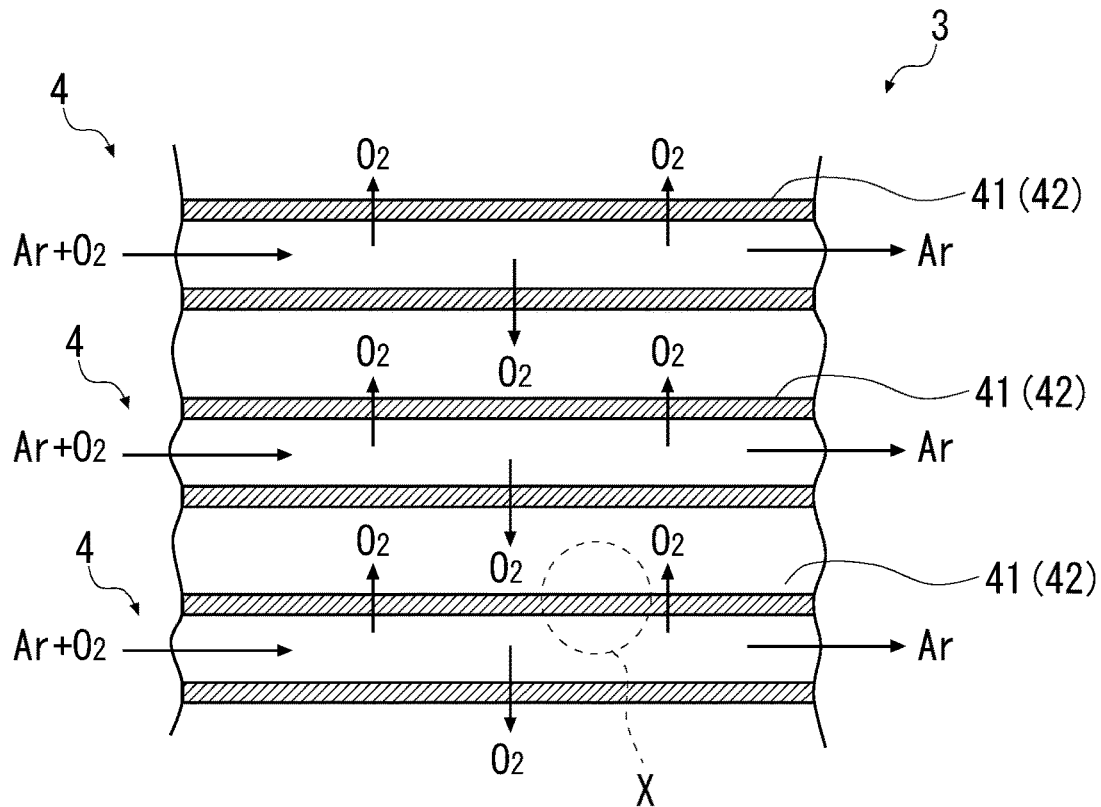
FIG. 2 is a cross-sectional view showing a configuration of an oxygen-removing unit according to a first embodiment of the present invention.
Figure 3:
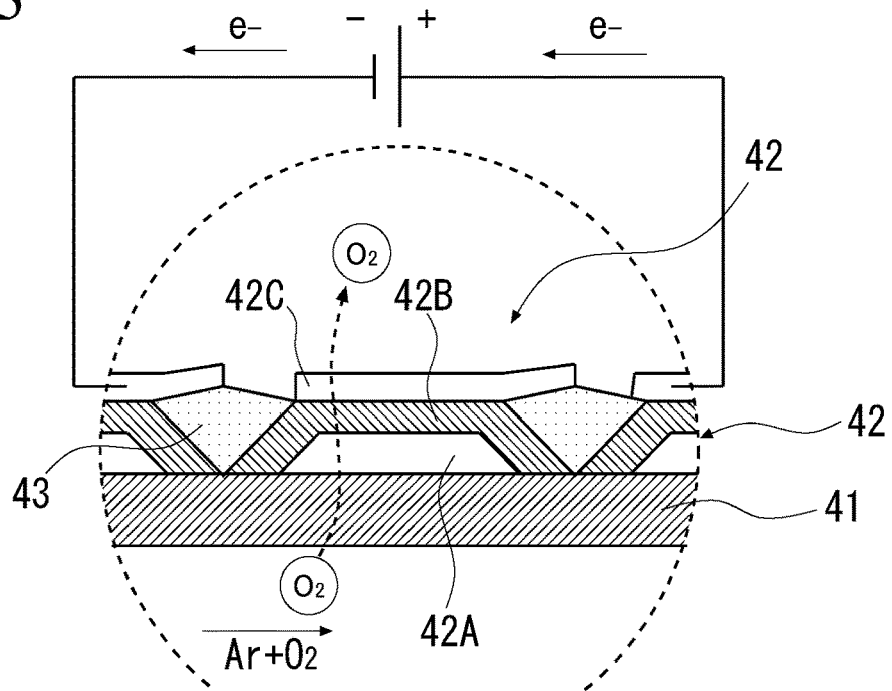
FIG. 3 is a main enlarged cross-sectional view of an oxygen-removing unit according to the first embodiment of the present invention (an enlarged cross-sectional view of an X part in FIG. 2).

A first embodiment of the present invention will be described with reference to FIG. 1 to FIG. 3. An electrolytic smelting system 100 of this embodiment is an apparatus for smelting ores such as iron ore and alumina ore by an electrolytic reaction. Additionally, the ore to be smelted is not limited to the above examples and the electrolytic smelting system 100 can be applied to any mineral resource that can be smelted by an electrolytic reaction.

Figure 1:
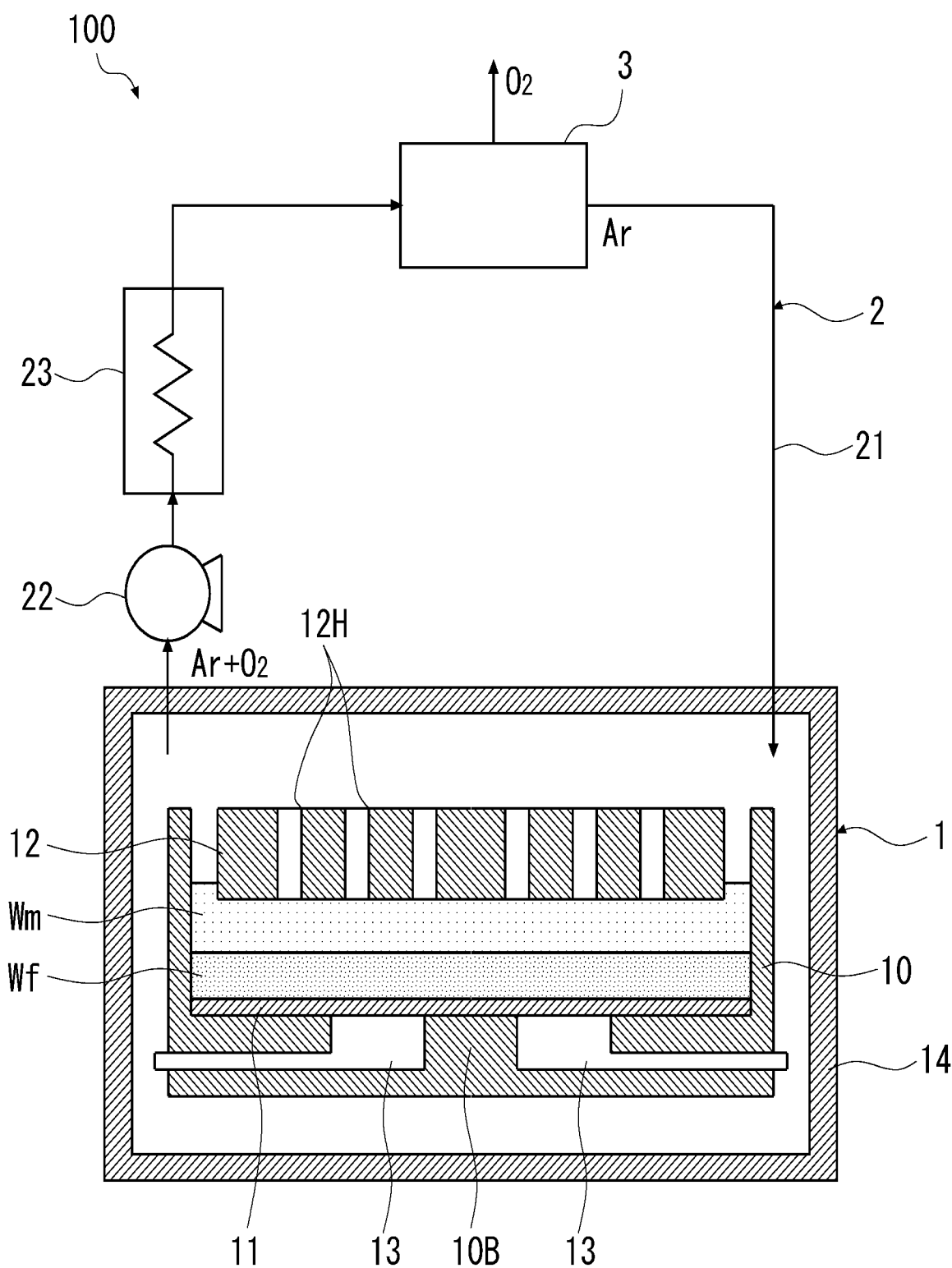
FIG. 1 is a diagram showing a configuration of an electrolytic smelting system according to a first embodiment of the present invention.

As shown in FIG. 1, the electrolytic smelting system 100 includes an electrolytic smelting furnace 1, an inert gas circulation unit 2, and an oxygen-removing unit 3. The electrolytic smelting furnace 1 is a facility for storing molten ore (molten ore Wm) and conducting the electrolytic reaction. The electrolytic smelting furnace 1 includes a furnace body 10, a cathode substrate 11, an anode substrate 12, a collector 13, and a housing 14.

The furnace body 10 is a container having a bottom portion 10B extending in a horizontal plane. The molten ore Wm is introduced into the furnace body 10. The molten ore Wm is heated and melted. The temperature of the molten ore Wm is determined based on the melting point of the material itself. As an example, the temperature of the molten ore Wm is set to 1200 to 2000° C. More preferably, this temperature is set to 1400 to 1700° C. Most preferably, the temperature of the molten ore Wm is set to 1500 to 1600° C.

The cathode substrate 11 is installed on the bottom portion 10B of the furnace body 10. As an example, the cathode substrate 11 has a plate shape integrally formed of a metal material containing molybdenum as a main component.

The anode substrates 12 are arranged at intervals in the vertical direction at a position inside the furnace body 10 and above the cathode substrate 11. As an example, the anode substrate 12 has a plate shape integrally formed of a metal material containing iron, chromium, vanadium, and tantalum. A plurality of through-holes 12H which penetrate the anode substrate 12 in the vertical direction are provided in the anode substrate 12. As will be described in detail later, these through-holes 12H are formed to allow the flow of an inert gas that removes oxygen adhering to the anode substrate 12.

The collector 13 is embedded in the lower portion of the cathode substrate 11 inside the bottom portion 10B of the furnace body 10. The collector 13 is formed of a conductive material and its one end is electrically connected to the cathode substrate 11. Additionally, in the example of FIG. 1, an example in which two collectors 13 are provided is shown, but the number of the collectors 13 is not limited to two.

The furnace body 10, the cathode substrate 11, the anode substrate 12, and the collector 13 are covered by the housing 14 from the outside. The inside of the housing 14 is kept air-tight and liquid-tight with respect to the outside.

A case in which iron ore is used as the molten ore Wm will be described. When performing electrolytic smelting, a voltage of a predetermined value is applied between the anode substrate 12 and the collector 13. An electrolytic reaction (reduction reaction) is conducted by applying this voltage, and diiron trioxide ($Fe_2O_3$) contained in the molten ore Wm in the furnace body 10 is reduced. As the reduction reaction is conducted, molten iron Wf (pure iron) precipitates, and the molten iron Wf settles on the cathode substrate 11 due to its own weight. As the amount of the molten iron Wf settled increases, the molten iron Wf itself functions as a cathode side terminal in addition to the cathode substrate 11.

On the other hand, a molten electrolyte containing a slag component precipitates on the anode substrate 12. Specifically, this molten electrolyte contains diiron trioxide ($Fe_2O_3$), which is the molten ore Wm to be electrolyzed, and slag, which is an impurity. The slag contains magnesium oxide, calcium oxide, silicon dioxide, aluminum oxide, and the like.

When such an electrolytic reaction (reduction reaction) is conducted, oxygen ions ionized from diiron trioxide are recombined on the anode side to form oxygen molecules. When the oxygen concentration (oxygen potential) in the molten ore Wm becomes excessively high or low, impurities may dissolve in the pure iron obtained by smelting. Therefore, it is necessary to maintain the oxygen potential properly.

In this embodiment, the inert gas circulation unit 2 supplies an inert gas into the electrolytic smelting furnace 1 so that it made oxygen be accompanied with the inert gas, and recovers the oxygen with the inert gas. Further, the oxygen-removing unit 3 removes oxygen from the mixed gas of the inert gas and oxygen recovered by the inert gas circulation unit 2, and the inert gas is reused.

The inert gas circulation unit 2 includes a circulation line 21 which guides a gas from the inside of the housing 14 to the outside thereof and then guides the gas into the housing 14 again, a compressor 22 which is provided on the circulation line 21, and a temperature control unit 23.

The circulation line 21 is filled with argon as an inert gas. As the inert gas, a rare gas containing helium, neon, krypton, xenon, or the like can be appropriately selected and used in addition to the argon. This inert gas is pressure-fed by the compressor 22 provided on the circulation line 21. The temperature control unit 23 is provided on the downstream side of the compressor 22. The temperature control unit 23 is provided to match the temperature of the gas flowing through the circulation line 21 with the operation range (temperature range) of the oxygen-removing unit 3 which will be described later. Specifically, a heat exchanger that exchanges heat between the refrigerant supplied from the outside and the gas flowing through the circulation line 21 is preferably used as the temperature control unit 23.

The oxygen-removing unit 3 is provided on the downstream side of the temperature control unit 23 in the circulation line 21. The oxygen-removing unit 3 removes only the oxygen from the gas (that is, the mixed gas of the inert gas and the oxygen) flowing through the circulation line 21. More specifically, as shown in FIG. 2 and FIG. 3, the oxygen-removing unit 3 includes a plurality of cell stacks 4 extending toward the upstream side and the downstream side of the circulation line 21 and arranged in parallel.

Each cell stack 4 includes a tubular base pipe 41, a plurality of fuel cells 42 which are formed on the outer peripheral surface of the base pipe 41, and an interconnector 43 which is provided between the adjacent fuel cells 42. The fuel cell 42 has a configuration in which a fuel electrode 42A, a solid electrolyte 42B, and an air electrode 42C are laminated in this order from the inner peripheral side to the outer peripheral side of the base pipe 41.

The base pipe 41 is, for example, a porous body formed of Cao-stabilized $ZrO_2$ (CSZ), $Y_2O_3$-stabilized $ZrO_2$ (YSZ), $MgAl_2O_4$, or the like. The mixed gas of the inert gas and the oxygen flows in the base pipe 41.

The fuel electrode 42A is formed of, for example, an oxide of Ni/YSZ or a composite material of Ni and a zirconia-based electrolyte material. In this case, Ni contained in the fuel electrode 42A acts as a catalyst for the mixed gas.

The air electrode 42C is formed of, for example, LaSrMnO_3-based oxide. The air electrode 42C is formed by a LaCoO_3-based oxide near the interface with the solid electrolyte 42B. The solid electrolyte 42B is mainly formed of, for example, YSZ. This YSZ has a property (air-tightness) that does not easily allow a gas to pass therethrough and also has high oxygen ion conductivity at a high temperature.

In the cell stack 4 with the above-described configuration, when a fuel gas flows inside the base pipe 41 and a gas as an oxidant flows outside the base pipe 41, a charge is generated in each fuel cell 42 due to the movement of oxygen ions. That is, the cell stack can be used as a power source. On the other hand, in this embodiment, oxygen molecules are moved inside and outside the base pipe 41 by applying a voltage to the fuel cell 42. That is, in this embodiment, the cell stack 4 is used as an oxygen pump. Accordingly, only the oxygen is separated from the mixed gas of the inert gas and the oxygen flowing through the base pipe 41 to permeate to the outside of the base pipe 41. As a result, the oxygen partial pressure in the mixed gas gradually decreases as it goes toward the downstream side in the extension direction of the base pipe 41. Finally, the mixed gas will be in a state where oxygen does not exist or very little is contained. In this way, since the oxygen is removed from the mixed gas when the mixed gas passes through the oxygen-removing unit 3, only the inert gas flows to the downstream side of the oxygen-removing unit 3 in the circulation line 21.

Additionally, the operating temperature of the cell stack 4 is 700 to 1000° C. That is, the temperature of the mixed gas flowing from the molten ore Wm to the circulation line 21 becomes higher than the temperature of the cell stack 4. Thus, in this embodiment, the temperature of the mixed gas is cooled to be in the range of 700 to 1000° C. by the temperature control unit 23.

According to the above-described configuration, it is possible to recover the oxygen generated on the anode substrate 12 by the inert gas supplied by the inert gas circulation unit 2. Accordingly, it is possible to avoid the contamination of impurities into the molten iron Wf due to the existence of the oxygen. Further, the oxygen recovered together with the inert gas is removed from the mixed gas in the oxygen-removing unit 3. When the oxygen is removed, the inert gas can be supplied to the molten ore Wm again through the circulation line 21. Accordingly, it is possible to decrease the usage amount of the inert gas. As a result, it is possible to obtain the molten iron Wf having higher purity at a lower cost.

Further, according to the above-described configuration, the oxygen in the base pipe 41 permeates to the outside when a voltage is applied to the fuel cell 42 in the oxygen-removing unit 3. That is, the fuel cell 42 is used as an oxygen pump. The oxygen permeation amount changes in response to the applied voltage. Thus, it is possible to precisely control the oxygen removal amount only by changing the voltage.

The operating temperature of the fuel cell 42 may differ from the melting point of the molten ore Wm. According to the above-described configuration, the temperature control unit 23 controls the temperatures of the inert gas and the oxygen in the circulation line 21 to the operating temperature of the fuel cell 42. Accordingly, it is possible to more efficiently perform the oxygen removing process in the oxygen-removing unit 3.

Figure 4:
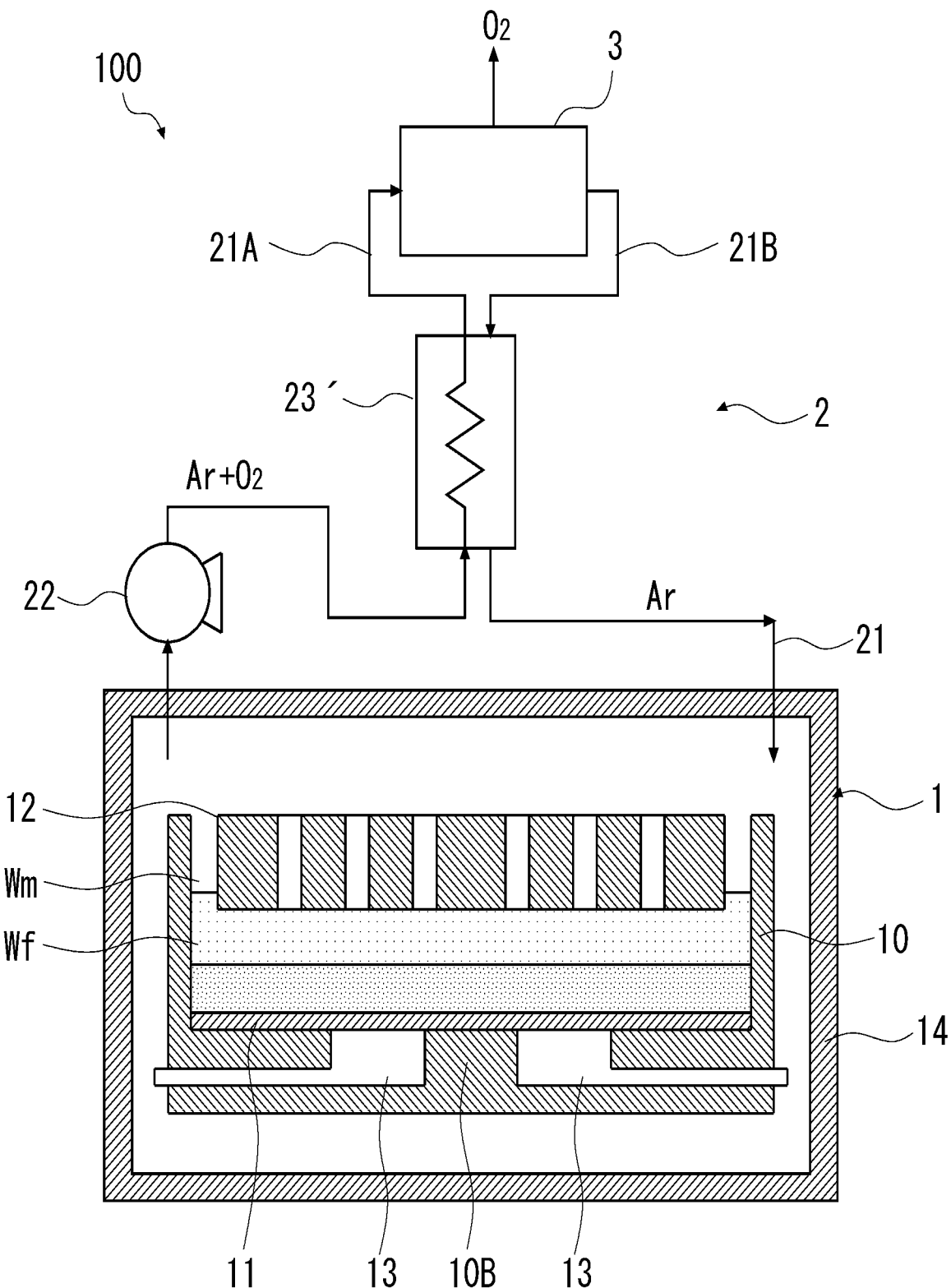
FIG. 4 is a diagram showing a modified example of the electrolytic smelting system according to the first embodiment of the present invention.

As described above, the first embodiment of the present invention has been described. However, it should be noted that various changes and improvements can be made to the above configuration as long as the gist of the present invention is not deviated. For example, in the first embodiment, an example has been described in which the heat exchanger exchanging heat between the refrigerant supplied from the outside and the mixed gas is applied as the temperature control unit 23. However, the configuration of the temperature control unit 23 is not limited to the description above. As another example, the configuration shown in FIG. 4 can be adopted. In the example shown in the same drawing, a heat exchanger that exchanges heat between the mixed gas flowing into the oxygen-removing unit 3 and the inert gas flowing out of the oxygen-removing unit 3 is used as a temperature control unit 23'. Specifically, the temperature control unit 23' is configured to exchange heat between the upstream portion (circulation line upstream portion 21A)

and the downstream portion (circulation line downstream portion 21B) of the oxygen-removing unit 3 in the circulation line 21.

According to the above-described configuration, in the temperature control unit 23', heat is exchanged between the gas (the inert gas and the oxygen) flowing into the oxygen-removing unit 3 and the gas (the inert gas) flowing out therefrom. The temperature of the gas flowing out of the oxygen-removing unit 3 is relatively lower than the temperature of the gas flowing thereinto. Thus, heat is transferred from the gas flowing into the oxygen-removing unit 3 to the gas flowing out therefrom. Accordingly, it is possible to easily and inexpensively control the temperature of the gas without using another refrigerant or cooling device.

Further, in the first embodiment, it is more desirable to conduct the electrolytic reaction in a state where the potential on the cathode substrate 11 is 1.0 V and the oxygen partial pressure is 1 atm or less. By carrying out the reaction under such conditions, the reduction of phosphorus contained in the molten ore Wm is suppressed. As a result, it is possible to further reduce the mixing of impurities into the molten iron Wf.

Second Embodiment

Figure 5:
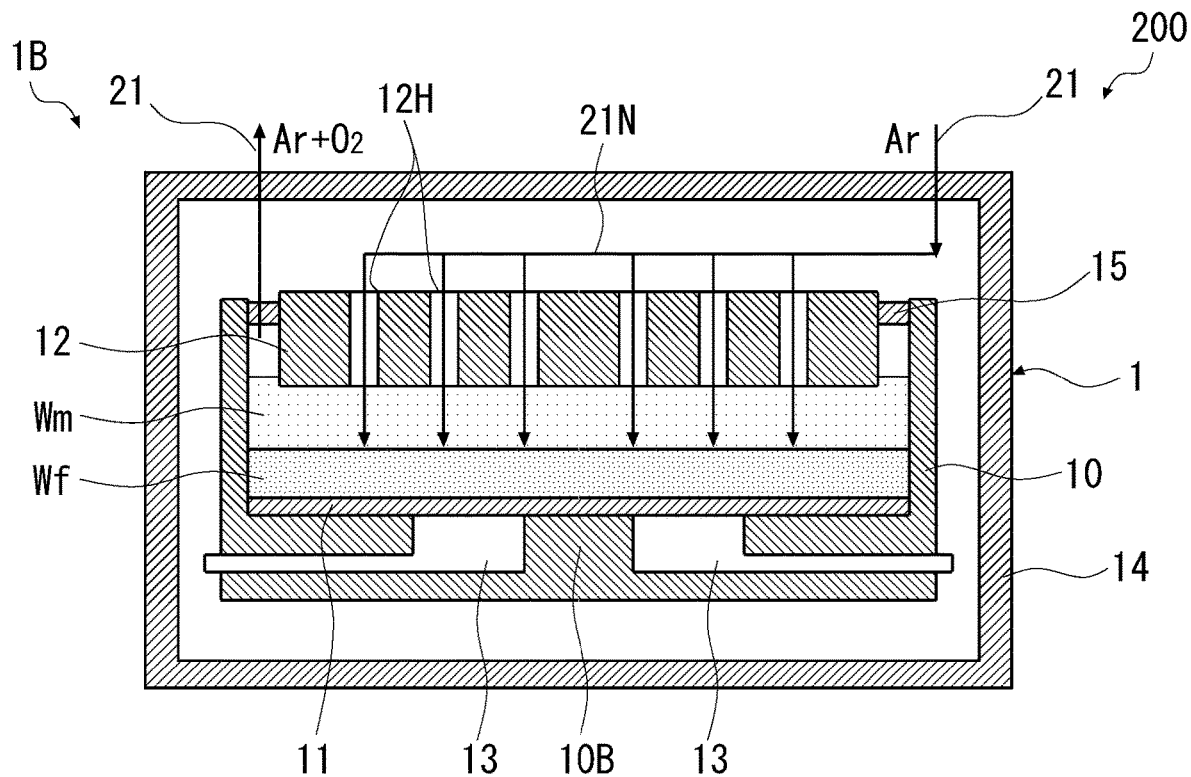
FIG. 5 is a cross-sectional view showing a configuration of an electrolytic smelting furnace according to a second embodiment of the present invention.

Next, a second embodiment of the present invention will be described with reference to FIG. 5. Additionally, the same components as those in the first embodiment are designated by the same reference numerals, and detailed description thereof will be omitted. As shown in FIG. 5, in an electrolytic smelting system 200 according to this embodiment, the configuration of an electrolytic smelting furnace 1B is different from that of the first embodiment. Specifically, in the electrolytic smelting furnace 1B, the end portion of the circulation line 21 (the end portion on the inert gas supply side to the furnace body 10) is provided with a plurality of nozzles 21N. These nozzles 21N are respectively inserted (connected) to the plurality of through-holes 12H formed in the anode substrate 12. Further, a gap between the furnace body 10 and the anode substrate 12 is closed by the lid 15. That is, the furnace body 10 is isolated from the space inside the housing 14.

According to the above-described configuration, the inert gas flowing through the circulation line 21 is supplied into the molten ore Wm through the plurality of through-holes 12H formed in the anode substrate 12. Accordingly, it is possible to more efficiently recover the oxygen generated on the anode substrate 12 and to alginate the molten ore Wm by the flow of the inert gas. As a result, the homogenization of the molten ore Wm is promoted and the electrolytic reaction (reduction reaction) can be stably conducted.

As described above, the second embodiment of the present invention has been described. However, it should be noted that various changes and improvements can be made to the above configuration as long as the gist of the present invention is not deviated.

Third Embodiment

Figure 6:
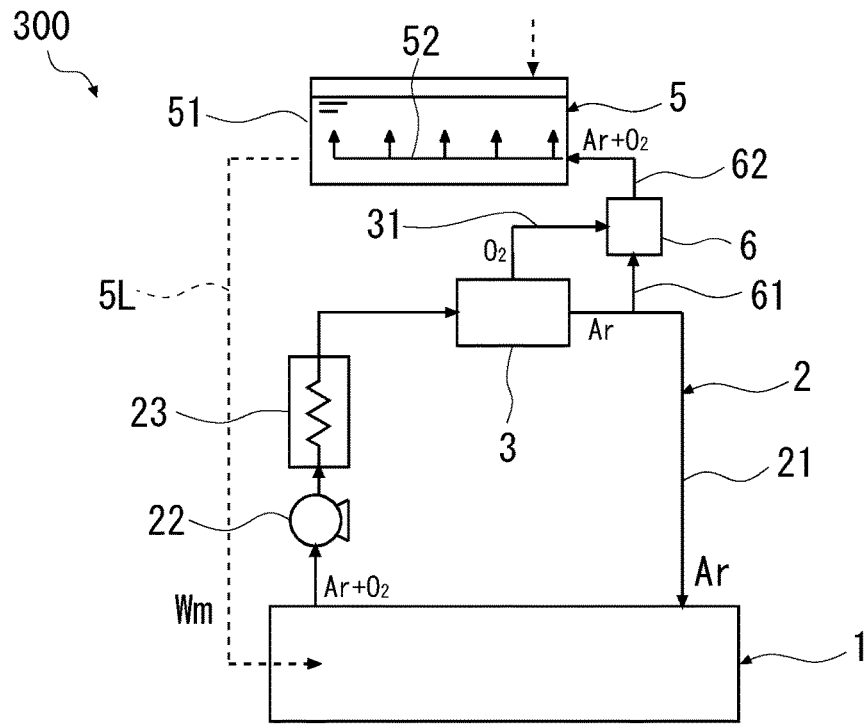
FIG. 6 is a diagram showing a configuration of an electrolytic smelting system according to a third embodiment of the present invention.

Next, a third embodiment of the present invention will be described with reference to FIG. 6. The same components as those in the above embodiments are designated by the same reference numerals, and detailed description thereof will be omitted. As shown in FIG. 6, an electrolytic smelting system 300 according to this embodiment further includes a preheating unit 5, a molten ore supply line 5L, a mixing unit 6, an oxygen supply line 31, an inert gas extraction line 61, and an injection line 62 in addition to the configuration of the first embodiment.

The preheating unit 5 preheats the molten ore Wm supplied to the furnace body 10. The preheating unit 5 includes a heating tank 51 which stores and heats (preheats) the molten ore Wm, a nozzle 52, and a molten ore supply line 5L. The nozzle 52 is provided in the heating tank 51 and supplies a mixed gas (a mixed gas of an inert gas and oxygen) guided from the circulation line 21 through an injection line 62 to be described later into the molten ore Wm. The molten ore supply line 5L supplies the molten ore Wm preheated in the heating tank 51 into the electrolytic smelting furnace 1.

The mixing unit 6 generates a mixed gas having a desired oxygen partial pressure by remixing the oxygen supplied from the oxygen-removing unit 3 and the inert gas taken out from the circulation line 21. The mixing unit 6 is connected to the oxygen-removing unit 3 through the oxygen supply line 31. The oxygen is supplied from the oxygen-removing unit 3 to the mixing unit 6 through the oxygen supply line 31. Further, the mixing unit 6 is connected to the downstream portion of the oxygen-removing unit 3 in the circulation line 21 through the inert gas extraction line 61. Some of the inert gas is supplied from the circulation line 21 to the mixing unit 6 through the inert gas extraction line 61. In the mixing unit 6, the oxygen and the inert gas are mixed so that the oxygen partial pressure becomes $10^{-6}$ to $10^{-5}$ atm. The mixed gas generated in the mixing unit 6 is supplied to the preheating unit 5 through the injection line 62.

According to the above-described configuration, the mixed gas composed of the inert gas and the oxygen is supplied into the molten ore Wm in the preheating unit 5. It is known that the sulfur content in the molten ore Wm is oxidized (becomes sulfur dioxide) and dissipated into a gas phase when the oxygen partial pressure in the mixed gas is a specific value (that is, the case of $10^{-6}$ to $10^{-5}$ atm). That is, according to the above-described configuration, it is possible to efficiently remove the sulfur content contained in the molten ore Wm prior to smelting only by supplying the mixed gas containing oxygen. On the other hand, when the sulfur content is dissolved in the molten ore Wm, it may be difficult to remove the sulfur content. According to the above-described configuration, it is possible to reduce such a possibility.

Further, according to the above-described configuration, it is possible to efficiently alginate the molten ore Wm stored in the heating tank 51 by the mixed gas blown out from the nozzle 52. Accordingly, it is possible to further homogenize the molten ore Wm. As a result, it is possible to efficiently conduct the electrolytic reaction (reduction reaction) that occurs in the furnace body 10.

As described above, the third embodiment of the present invention has been described. However, it should be noted that various changes and improvements can be made to the above configuration as long as the gist of the present invention is not deviated.

Fourth Embodiment

Figure 7:
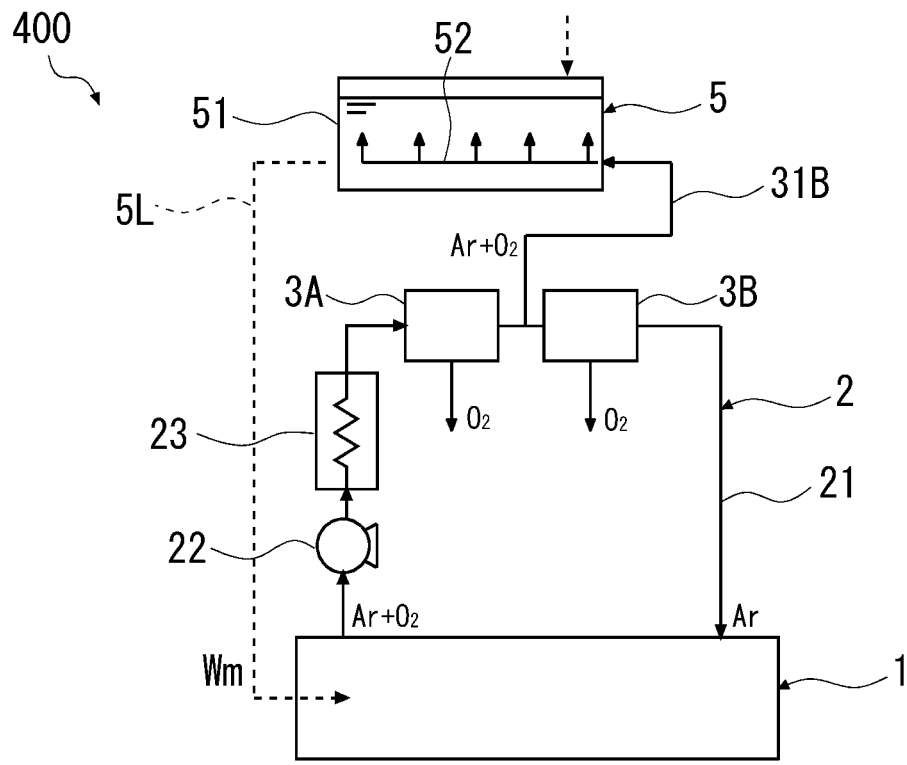
FIG. 7 is a diagram showing a configuration of an electrolytic smelting system according to a fourth embodiment of the present invention.

Next, a fourth embodiment of the present invention will be described with reference to FIG. 7. The same components as those in the above embodiments are designated by the same reference numerals, and detailed description thereof will be omitted. As shown in FIG. 7, an electrolytic smelting system 400 according to this embodiment further includes a first oxygen-removing unit 3A, a second oxygen-removing unit 3B, and an injection line 31B together with the preheating unit 5 and the molten ore supply line 5L which are described in the third embodiment in addition to the configuration of the first embodiment. The first oxygen-removing unit 3A and the second oxygen-removing unit 3B each has the same configuration as the oxygen-removing unit 3.

The first oxygen-removing unit 3A and the second oxygen-removing unit 3B are arranged in series on the circulation line 21. The first oxygen-removing unit 3A is disposed on the upstream side of the second oxygen-removing unit 3B. Further, the injection line 31B which extends toward the preheating unit 5 is provided between the first oxygen-removing unit 3A and the second oxygen-removing unit 3B on the circulation line 21.

In the first oxygen-removing unit 3A, the voltage (first voltage) applied to the fuel cell 42 is set to be higher than the voltage (second voltage) applied to the fuel cell 42 of the second oxygen-removing unit 3B. Accordingly, in the first oxygen-removing unit 3A, only some of the oxygen is removed from the mixed gas supplied through the circulation line 21. Specifically, in the first oxygen-removing unit 3A, the oxygen is removed until the oxygen partial pressure of the mixed gas becomes $10^{-6}$ to $10^{-5}$ atm. In other words, the first voltage applied to the first oxygen-removing unit 3A is a value which is set in advance so that the oxygen partial pressure becomes the above-described value.

Some of the mixed gas in which the oxygen partial pressure becomes $10^{-6}$ to $10^{-5}$ atm in the first oxygen-removing unit 3A is supplied to the preheating unit 5 through the injection line 31B. In the preheating unit 5, the sulfur content contained in the molten ore Wm is oxidized by the mixed gas and is dissipated into the gas phase. On the other hand, in the second oxygen-removing unit 3B, all oxygen is removed from the residual components of the mixed gas supplied from the first oxygen-removing unit 3A. Since the oxygen is removed in the second oxygen-removing unit 3B, only the inert gas is supplied to the electrolytic smelting furnace 1 through the circulation line 21.

According to the above-described configuration, in the first oxygen-removing unit 3A, the mixed gas having a predetermined value of the oxygen partial pressure is generated based on the first voltage. This mixed gas is supplied to the preheating unit 5.

It is known that the sulfur content in the molten ore Wm is oxidized (becomes sulfur dioxide) and dissipated into a gas phase when the oxygen partial pressure in the mixed gas is a specific value (that is, the case of $10^{-6}$ to $10^{-5}$ atm). Further, it is also known that the oxygen partial pressure changes based on the magnitude of the applied voltage. Thus, according to the above-described configuration, it is possible to efficiently remove the sulfur content contained in the molten ore Wm prior to smelting only by changing the voltage (applying the first voltage). Further, in the above-described configuration, it is possible to remove the residual oxygen by the second oxygen-removing unit 3B from the residual mixed gas that has not been supplied to the preheating unit 5. Accordingly, it is possible to supply a highly pure inert gas from the second oxygen-removing unit 3B into the molten ore Wm.

As described above, the fourth embodiment of the present invention has been described. However, it should be noted that various changes and improvements can be made to the above configuration as long as the gist of the present invention is not deviated.

Fifth Embodiment

Figure 8:
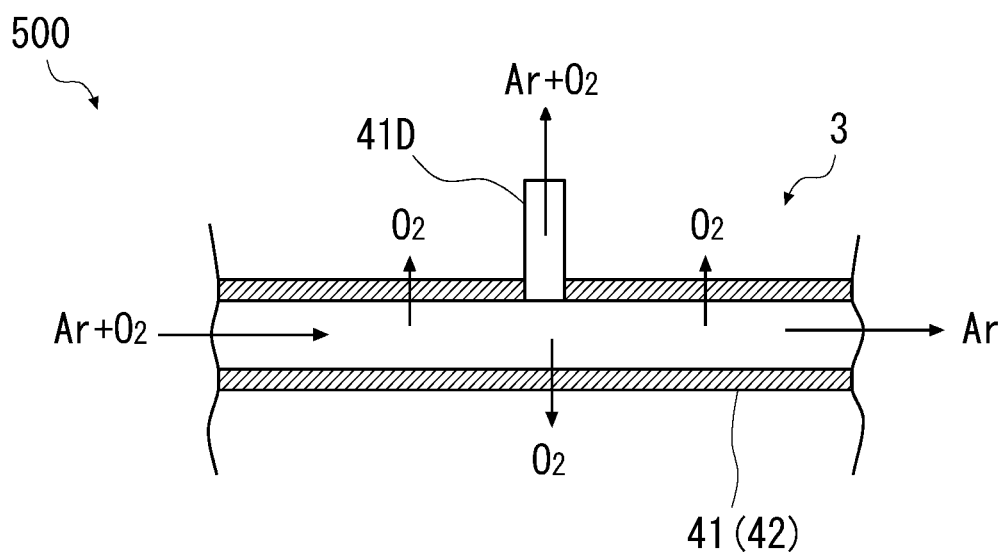
FIG. 8 is a diagram showing a configuration of an oxygen-removing unit according to a fifth embodiment of the present invention.

Next, a fifth embodiment of the present invention will be described with reference to FIG. 8. The same components as those in the above embodiments are designated by the same reference numerals, and detailed description thereof will be omitted. In an electrolytic smelting system 500 according to this embodiment, the configuration of the oxygen-removing unit 3 is different from those of the above embodiments. In this embodiment, a branch pipe 41D extracting a mixed gas in the base pipe 41 is provided at a middle position in the extension direction of the base pipe 41 of the oxygen-removing unit 3.

The oxygen partial pressure becomes lower as it goes from the upstream side toward the downstream side in the extension direction in the base pipe 41. The branch pipe 41D is branched at a portion corresponding to the middle position of the base pipe 41 and having a predetermined oxygen partial pressure. Specifically, the branch pipe 41D is provided at a position in which the oxygen partial pressure becomes $10^{-6}$ to $10^{-5}$ atm. That is, the branch pipe 41D is provided at a position capable of obtaining the oxygen partial pressure at which the sulfur content is not easily dissolved in the molten ore Wm. Since the mixed gas under the oxygen partial pressure is supplied to the preheating unit 5, it is possible to dissipate the sulfur content from the molten ore Wm into the gas phase without using other devices. Thus, it is possible to more easily remove the sulfur content in the subsequent treatment process.

As described above, the fifth embodiment of the present invention has been described. It is possible to make various additional changes and improvements to the above configuration as long as the gist of the present invention is not deviated.

Sixth Embodiment

Figure 9:
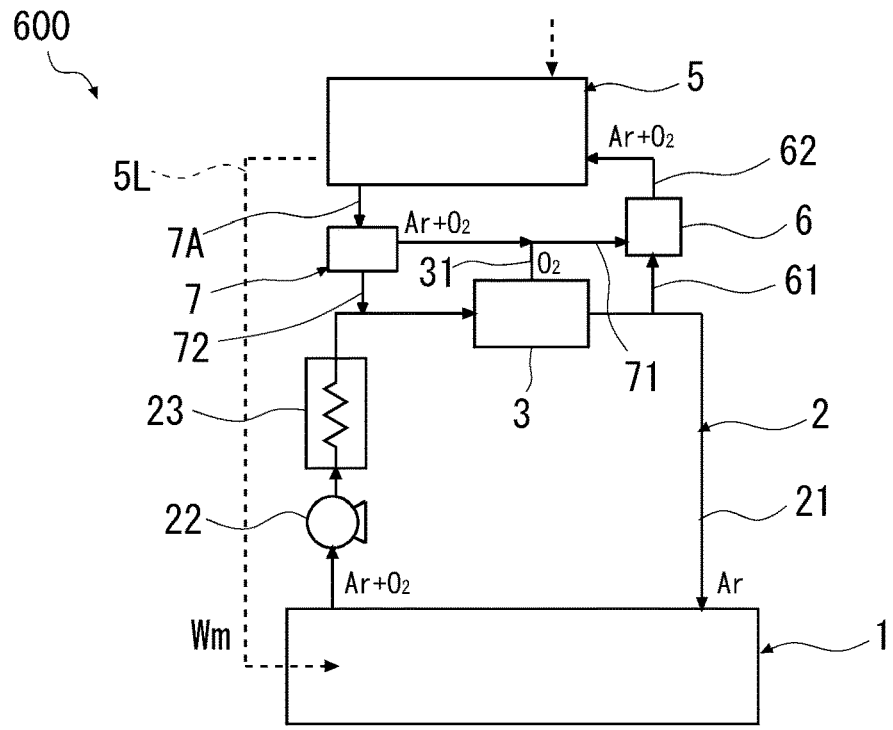
FIG. 9 is a diagram showing a configuration of an electrolytic smelting system according to a sixth embodiment of the present invention.

Next, a sixth embodiment of the present invention will be described with reference to FIG. 9. The same components as those in the above embodiments are designated by the same reference numerals, and detailed description thereof will be omitted. As shown in FIG. 9, an electrolytic smelting system 600 according to this embodiment further includes a sulfur recovery device 7, a mixed gas supply line 7A, a first extraction line 71, and a second extraction line 72 in addition to the configuration described in the third embodiment.

The sulfur recovery device 7 is provided on the downstream side of the preheating unit 5 (that is, between the preheating unit 5 and the upstream portion of the oxygen-removing unit 3 on the circulation line 21). The sulfur recovery device 7 is connected to the preheating unit 5 via the mixed gas supply line 7A. The sulfur recovery device 7 removes the sulfur content contained in the mixed gas (the mixed gas of the inert gas and the oxygen) in which the molten ore Wm has been agitated by the preheating unit 5. Specifically, as the sulfur recovery device 7, a device that adsorbs and removes the sulfur content with an alkaline liquid, slaked lime, or activated carbon is preferably used. When the sulfur content is removed, the desulfurized mixed gas is generated in the sulfur recovery device 7. Some of the desulfurized mixed gas is supplied to the mixing unit 6 through the first extraction line 71 which connects the sulfur recovery device 7 and the mixing unit 6. Further, other components of the desulfurized mixed gas are sent to the upstream side of the oxygen-removing unit 3 in the circulation line 21 through the second extraction line 72.

According to the above-described configuration, it is possible to reflux the desulfurized mixed gas containing the inert gas and the oxygen from the sulfur recovery device 7 to the mixing unit 6 through the first extraction line 71. Thus, it is possible to more precisely adjust the oxygen partial pressure of the mixed gas generated by the mixing unit 6. As a result, it is possible to more efficiently recover the sulfur content by the sulfur recovery device 7.

Further, according to the above-described configuration, it is possible to reflux the desulfurized mixed gas containing the inert gas and the oxygen from the sulfur recovery device 7 to the oxygen-removing unit 3 through the second extraction line 72. Thus, it is possible to reuse the inert gas that has been used for recovering the sulfur content in the sulfur recovery device 7. Accordingly, it is possible to decrease the usage amount of the inert gas.

As described above, the sixth embodiment of the present invention has been described. However, it should be noted that various changes and improvements can be made to the above configuration as long as the gist of the present invention is not deviated. For example, it is possible to adopt a configuration in which only the first extraction line 71 is provided without providing the second extraction line 72 of the sixth embodiment.

Seventh Embodiment

Figure 10:
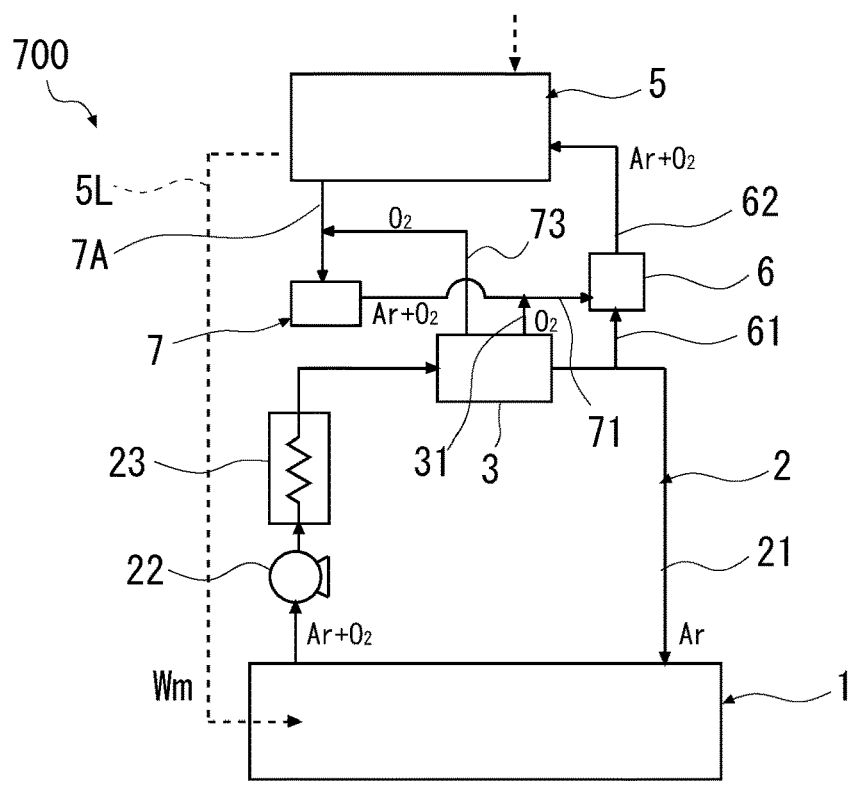
FIG. 10 is a diagram showing a configuration of an electrolytic smelting system according to a seventh embodiment of the present invention.

Next, a seventh embodiment of the present invention will be described with reference to FIG. 10. The same components as those in the above embodiments are designated by the same reference numerals, and detailed description thereof will be omitted. As shown in FIG. 10, an electrolytic smelting system 700 according to this embodiment further includes an oxygen addition line 73 together with the sulfur recovery device 7 and the mixed gas supply line 7A which are described in the sixth embodiment in addition to the configuration described in the third embodiment.

The oxygen addition line 73 connects the middle position of the mixed gas supply line 7A and the oxygen-removing unit 3. That is, some of the oxygen generated in the oxygen-removing unit 3 is supplied to the mixed gas flowing from the preheating unit 5 toward the sulfur recovery device 7 through the oxygen addition line 73.

According to the above-described configuration, oxygen is supplied to the mixed gas directed from the preheating unit 5 toward the sulfur recovery device 7 through the oxygen addition line 73. Accordingly, since the oxygen partial pressure of the mixed gas increases, it is possible to promote the oxidation of the sulfur content contained in the mixed gas. Specifically, it is possible to change sulfur dioxide ($SO_2$) in the mixed gas to more stable sulfur trioxide ($SO_3$). As a result, it is possible to more easily and efficiently recover the sulfur content in the sulfur recovery device 7.

As described above, the seventh embodiment of the present invention has been described. However, it should be noted that various changes and improvements can be made to the above configuration as long as the gist of the present invention is not deviated.

For example, the electrolytic smelting system may be used not only for smelting to extract metal from ore, but also for smelting to increase the purity of metal.

INDUSTRIAL APPLICABILITY

The present invention is applicable to an electrolytic smelting system.

REFERENCE SIGNS LIST

100, 200, 300, 400, 500, 600, 700 Electrolytic Smelting System
1 Electrolytic Smelting Furnace
2 Inert Gas Circulation Unit
3 Oxygen-removing unit
3A First Oxygen-removing unit
3B Second Oxygen-removing unit
4 Cell Stack
5 Preheating Unit
5L Molten Ore Supply Line
6 Mixing Unit
7 Sulfur Recovery Device
7A Mixed Gas Supply Line
10 Furnace Body
10B Bottom Portion
11 Cathode Substrate
12 Anode Substrate
12H Through-Hole
13 Collector
14 Housing
15 Lid
21 Circulation Line
21A Circulation Line Upstream Portion
21B Circulation Line Downstream Portion
21N Nozzle
22 Compressor
23, 23' Temperature Control Unit
31 Oxygen Supply Line
31B Injection Line
41 Base Pipe
41D Branch Pipe
42 Fuel Cell
42A Fuel Electrode
42B Solid Electrolyte
42C Air Electrode
43 Interconnector
51 Heating Tank
52 Nozzle
61 Inert Gas Extraction Line
62 Injection Line
71 First Extraction Line
72 Second Extraction Line
73 Oxygen Addition Line
Wf Molten Iron
Wm Molten Ore

The invention claimed is:

1. An electrolytic smelting system comprising: an electrolytic smelting furnace including a furnace body to which a molten ore is introduced, a cathode substrate which is installed on a bottom portion in the furnace body, and an anode substrate which is positioned above the cathode substrate in the furnace body; an inert gas circulation unit including a circulation line configured to supply inert gas to the molten ore and to recover oxygen generated on an anode substrate side together with the inert gas as a mixed gas; and an oxygen-removing unit which is installed in the circulation line and configured to remove the oxygen from the circulation line, wherein the oxygen-removing unit is configured to remove the oxygen from the mixed gas of the inert gas and the oxygen recovered by the inert gas circulation unit, and is configured to reuse the inert gas, and the oxygen-removing unit includes a cell stack having a base pipe through which the inert gas and the oxygen are flowed and a fuel cell which is installed on an outer peripheral surface of the base pipe and which allows the oxygen in the base pipe to permeate to an outside of the base pipe in response to an applied voltage.

2. The electrolytic smelting system according to claim 1, further comprising:
   a temperature control unit which is installed on an upstream side of the oxygen-removing unit in the circulation line and which is configured to control the temperatures of the inert gas and the oxygen flowing through the circulation line to an operating temperature of the fuel cell.

3. The electrolytic smelting system according to claim 2, wherein the temperature control unit is configured to exchange heat between a relatively high-temperature inert gas and oxygen flowing into the oxygen-removing unit and a relatively low-temperature inert gas flowing out of the oxygen-removing unit.

4. The electrolytic smelting system according to claim 1, wherein a plurality of through-holes are formed in the anode substrate so as to penetrate the anode substrate in a vertical direction, and
   wherein the circulation line is connected to the plurality of through-holes.

5. The electrolytic smelting system according to claim 1, further comprising:
   a preheating unit which is configured to preheat the molten ore supplied to the furnace body; and
   a mixing unit which is configured to generate a mixed gas by mixing the oxygen removed from the circulation line in the oxygen-removing unit and the inert gas extracted from a downstream side of the oxygen-removing unit in the circulation line, and passed through an inert gas extraction line and supply the mixed gas to the preheating unit.

6. The electrolytic smelting system according to claim 1, further comprising:
   a preheating unit which is configured to preheat the molten ore supplied to the furnace body,
   wherein the oxygen-removing unit includes a first oxygen-removing unit which is configured to generate a mixed gas of the inert gas and the oxygen having a predetermined value of an oxygen partial pressure by removing some of the oxygen from the circulation line by applying a predetermined first voltage and supplying the mixed gas through an injection line to the preheating unit and a second oxygen-removing unit which is configured to remove the oxygen from a residual component of the mixed gas supplied from the first oxygen-removing unit by applying a second voltage lower than the first voltage.

7. The electrolytic smelting system according to claim 5, wherein the preheating unit includes a heating tank which stores the molten ore and a nozzle which is positioned in the heating tank and supplies the mixed gas into the molten ore.

8. The electrolytic smelting system according to claim 1, wherein the oxygen-removing unit further includes a branch pipe which is branched at a portion corresponding to a middle position of the base pipe in an extension direction thereof and supplies a mixed gas to the preheating unit, wherein an oxygen partial pressure in the base pipe at the middle position has a predetermined value.

9. The electrolytic smelting system according to claim 5, further comprising:
   a sulfur recovery device which is installed on a downstream side of the preheating unit and which is configured to recover a sulfur content contained in the mixed gas flowing from the preheating unit to generate a desulfurized mixed gas; and
   a first extraction line which supplies the desulfurized mixed gas from the sulfur recovery device to the mixing unit.

10. The electrolytic smelting system according to claim 5, further comprising:
    a sulfur recovery device which is installed on a downstream side of the preheating unit and which is configured to recover a sulfur content contained in the mixed gas flowing from the preheating unit to generate a desulfurized mixed gas; and
    a second extraction line which supplies the desulfurized mixed gas from the sulfur recovery device to the oxygen-removing unit.

11. The electrolytic smelting system according to claim 9, further comprising:
    an oxygen addition line which supplies the oxygen removed in the oxygen-removing unit to the mixed gas flowing from the preheating unit toward the sulfur recovery device.

12. The electrolytic smelting system according to claim 6, wherein the preheating unit includes a heating tank which stores the molten ore and a nozzle which is positioned in the heating tank and supplies the mixed gas into the molten ore.

13. The electrolytic smelting system according to claim 6, further comprising:
    a sulfur recovery device which is installed on a downstream side of the preheating unit and which is configured to recover a sulfur content contained in the mixed gas flowing from the preheating unit to generate a desulfurized mixed gas; and
    a second extraction line which supplies the desulfurized mixed gas from the sulfur recovery device to the oxygen-removing unit.

14. The electrolytic smelting system according to claim 13, further comprising:
    an oxygen addition line which supplies a part of the oxygen removed in the oxygen-removing unit to the mixed gas flowing from the preheating unit toward the sulfur recovery device.

* * * * *